(12) United States Patent
El Assaad (10) Patent No.: US 12,443,183 B2
(45) Date of Patent: Oct. 14, 2025

(54) VEHICLE, INFRASTRUCTURE COMPONENT, APPARATUS, COMPUTER PROGRAM, AND METHOD FOR A VEHICLE

(71) Applicant: VOLKSWAGEN AKTIENGESELLSCHAFT, Wolfsburg (DE)

(72) Inventor: Ahmad El Assaad, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 96 days.

(21) Appl. No.: 18/264,560

(22) PCT Filed: Feb. 9, 2022

(86) PCT No.: PCT/EP2022/053165
§ 371 (c)(1),
(2) Date: Aug. 7, 2023

(87) PCT Pub. No.: WO2022/171698
PCT Pub. Date: Aug. 18, 2022

(65) Prior Publication Data
US 2024/0045425 A1 Feb. 8, 2024

(30) Foreign Application Priority Data
Feb. 9, 2021 (EP) .................................. 21156141

(51) Int. Cl.
*G05D 1/00* (2024.01)
(52) U.S. Cl.
CPC ......... *G05D 1/0061* (2013.01); *G05D 1/0022* (2013.01)
(58) Field of Classification Search
CPC .................. G05D 1/0061; G05D 1/0022
See application file for complete search history.

(56) References Cited

U.S. PATENT DOCUMENTS 10,203,699 B1 * 2/2019 Kim ..................... H04W 12/08
2017/0205823 A1   7/2017 Arndt et al.
(Continued)

FOREIGN PATENT DOCUMENTS

CN   110501927 A   11/2019
DE   102013201168 A1   7/2014
(Continued)

OTHER PUBLICATIONS

Extended European Search Report; European Patent Application No. 21156141.0; Jun. 30, 2021.
(Continued)

*Primary Examiner* — Anne Marie Antonucci
*Assistant Examiner* — Patrick Daniel Mohl
(74) *Attorney, Agent, or Firm* — BARNES & THORNBURG LLP (57) ABSTRACT

A transportation vehicle, an infrastructure component, an apparatus, a computer program, and a method for a transportation vehicle to be remotely operated in a remote driving mode and to be manually operated by a driver in the transportation vehicle in a manual driving mode. The method includes determining driving preferences of the driver based on driving behavior of the driver, predicting information on a future traffic situation for switching from the remote driving mode to the manual driving mode, determining a predicted quality of service (pQoS) of a communication link for the remote driving mode and a remote operation interval for which the transportation vehicle is operable in the remote driving mode based on the pQoS, and determining a handover time and/or a handover place for switching from the remote driving mode to the manual driving mode.

22 Claims, 2 Drawing Sheets

(56) References Cited

U.S. PATENT DOCUMENTS

| | | | |
|---|---|---|---|
| 2018/0039268 A1* | 2/2018 | Mangal | B60W 60/0051 |
| 2018/0088574 A1 | 3/2018 | Latotzki et al. | |
| 2018/0196426 A1* | 7/2018 | Kim | B61L 27/57 |
| 2018/0231982 A1* | 8/2018 | Yunoki | G05D 1/0061 |
| 2018/0284759 A1* | 10/2018 | Michalakis | B60W 60/0059 |
| 2019/0064800 A1* | 2/2019 | Frazzoli | G05D 1/0061 |
| 2019/0384278 A1* | 12/2019 | Otaka | H04L 67/12 |
| 2020/0057436 A1* | 2/2020 | Boda | G08G 1/09 |
| 2020/0064833 A1* | 2/2020 | Fox | B60W 60/0057 |
| 2020/0192360 A1 | 6/2020 | Zheng et al. | |
| 2021/0031799 A1 | 2/2021 | Tokuda et al. | |
| 2022/0004187 A1* | 1/2022 | Matsunaga | B60K 35/22 |
| 2022/0011767 A1 | 1/2022 | Nicodemus et al. | |
| 2022/0035337 A1* | 2/2022 | Mcgee | H04L 67/125 |
| 2022/0075366 A1* | 3/2022 | Blank | B60W 60/001 |
| 2022/0371589 A1* | 11/2022 | Kono | G05D 1/0027 |
| 2022/0413489 A1* | 12/2022 | Nakano | H04W 4/44 |
| 2023/0305559 A1* | 9/2023 | Takeyasu | G05D 1/0061 |

FOREIGN PATENT DOCUMENTS

| | | |
|---|---|---|
| DE | 102016200513 A1 | 7/2017 |
| DE | 102018251771 A1 | 7/2020 |
| DE | 102019204934 A1 | 10/2020 |
| EP | 3279053 A1 | 2/2018 |

OTHER PUBLICATIONS

International Search Report; International Patent Application No. PCT/EP2022/053165; Apr. 22, 2022.

* cited by examiner

VEHICLE, INFRASTRUCTURE COMPONENT, APPARATUS, COMPUTER PROGRAM, AND METHOD FOR A VEHICLE

PRIORITY CLAIM

This patent application is a U.S. National Phase of International Patent Application No. PCT/EP2022/053165, filed 9 Feb. 2022, which claims priority to European Patent Application No. 21156141.0, filed 9 Feb. 2021, the disclosures of which are incorporated herein by reference in their entireties.

SUMMARY

Illustrative embodiments relate to a transportation vehicle, an infrastructure component, an apparatus, a computer program, and a method for a transportation vehicle. In particular, illustrative embodiments relate to a concept for a handover of control over a transportation vehicle when switching from remote driving mode to manual driving mode.

BRIEF DESCRIPTION OF THE DRAWINGS

Disclosed embodiments will be described with reference to the drawings, in which.

DETAILED DESCRIPTION

Several transportation vehicle concepts provide for operating transportation vehicles in different modes. In such concepts, transportation vehicles, e.g., are operated at times in a remote driving mode where a remote driver operates the transportation vehicle from remote and at other times in a manual driving mode where a driver in the transportation vehicle has control over it. In some concepts, it may be desired to switch from the remote driving mode to the manual driving mode while driving.

Document DE 10 2019 204943 A1 refers to a concept for teleoperated driving which provides for adjusting the teleoperated driving based on a predicted quality of service of a communication connection between a transportation vehicle and a control center.

Document EP 3 279 053 A1 refers to an operator-evaluation system for an automated transportation vehicle which includes a traffic-detector and a controller. The traffic-detector is used to determine a complexity-ranking of a traffic-scenario approached by a host-vehicle. The controller is in communication with the traffic-detector and is configured to operate the host-vehicle, depending on the complexity-ranking and a skill-ranking of an operator in an automated-mode, monitored mode, or manual mode.

Document US 2020/192360 A1 relates to a concept of determining a risk of operating a transportation vehicle in a current mode and switching modes.

Document US 2021/0031799 A1 relates to a remote operation system including a processor that is configured to acquire position information and communication quality information from each of plural transportation vehicles on a regular basis, create position-specific communication quality information in which the position information and the communication quality information are associated with each other, and supply the position-specific communication quality information to an operator of a remote operation target transportation vehicle.

Document DE 10 2013 201 168 A1 discloses an activated remote control system for a transportation vehicle and a concept for a handover of control over the transportation vehicle from a remotely controlled driving operation to a driver in the transportation vehicle. This concept particularly provides for terminating the remotely controlled driving operation and transferring the control to the driver after a predefined time, at a predefined location, and/or in response to a request of the driver. Depending on the time, the location, or when the driver requests control, the driver may have trouble taking over the control. For example, the driver may have trouble taking over the control over the transportation vehicle when the transportation vehicle is about to go through a curve.

Document DE 10 2018 251 771 A1 provides a concept for a transportation vehicle and for transferring control over the transportation vehicle from a driver in the transportation vehicle or an automated driving system to a remote operator for remotely controlled operation of the transportation vehicle and vice versa. For transferring the control from the remote operator back to the driver, it is proposed to determine whether the driver is ready to take over the control and whether other conditions, e.g., for a traffic state are fulfilled. However, some drivers may have trouble to take over the control under the predefined conditions.

Document DE 10 2016 200 513 A1 provides a concept for operating a transportation vehicle and for transferring control over the transportation vehicle when changing from a first driving mode in which an at least partial automation of the control of the transportation vehicle is obtained. The transportation vehicle also exhibits a second driving mode in which the automation has been at least partially cancelled and replaced by a manual control of the transportation vehicle on the part of the driver. For this, it is proposed to ascertain at least one parameter that is characteristic of a current status of the driver in a first operation and adapt a transition strategy for the transition between the first driving mode and the second driving mode in a manner depending on the parameter. The current status, e.g., is indicative of a current seating posture, activity of the driver, state of distraction. Accordingly, the transition strategy may be adapted to a prediction for the driver's reaction time predicted based on the seating posture, the activity, or state of distraction. Also, the transition strategy is adapted to a traffic situation around the transportation vehicle. However, some drivers may struggle to take over the control in some traffic situations although they are not distracted and ready to take over the control. Furthermore, the aforementioned document is silent about a transfer of control from a mode where the transportation vehicle is remotely controlled.

Hence, there may be a demand for an improved concept for transferring control of a transportation vehicle when switching from a remote driving mode of the transportation vehicle to a manual driving mode of a transportation vehicle.

This demand may be satisfied by the subject-matter of the appended independent and dependent claims.

Disclosed embodiments are based on the finding that a handover of control for switching from a remote driving mode to a manual driving mode of a transportation vehicle is safe when and/or where it is convenient for a driver in the transportation vehicle to take over control of the transportation vehicle. Since different drivers may have various driving preferences, different traffic situations may be convenient with respect to various driving preferences of different drivers. It is also a finding that it is beneficial to hand over the control of the transportation vehicle "seamlessly" when switching from the remote driving mode to the manual driving mode to avoid loss of control for a considerable time. Hence, it is a basic idea of the present disclosure to hand over control of the transportation vehicle as long as the transportation vehicle is operable in the remote driving mode according to a prediction for a quality of service of a communication for remote operation.

Disclosed embodiments provide a method for a transportation vehicle configured to be remotely operated in a remote driving mode and to be manually operated by a driver in the transportation vehicle in a manual driving mode. The method comprises determining driving preferences of the driver based on driving behavior of the driver. Further, the method comprises predicting, based on the driving preferences, information on a future traffic situation for switching from the remote driving mode to the manual driving mode. Also, the method comprises determining a predicted quality of service (pQoS) of a communication link for the remote driving mode and a remote operation interval for which the transportation vehicle is operable in the remote driving mode based on the pQoS. The method further comprises determining a handover time and/or a handover place for switching from the remote driving mode to the manual driving mode based on the remote operation interval and the information on the future traffic situation. The information on the future traffic situation, e.g., indicates when and/or where it is convenient for the driver to take over control of the transportation vehicle. The information on the future traffic situation may comprise information on a time and/or a location for switching from the remote driving mode to the manual driving mode. Thus, exemplary embodiments may provide a seamless and safe handover of the transportation vehicle when or where it is convenient for the driver to take over control of the transportation vehicle when switching from the remote driving mode to the manual driving mode. Accordingly, the method may further comprise handing over control over the transportation vehicle to the driver at or before the handover time and/or handover place.

Predicting information on the future traffic situation may comprise predicting the information on the future traffic situation based on information on a current traffic situation. This allows, e.g., to determine whether the current traffic situation is (already) convenient for the handover, e.g., for an immediate or soon handover. Additionally, or alternatively, the information on the future traffic situation information is predicted on one or more present control commands of a remote driver in the remote driving mode, information on the remote driver, and/or information on driving behavior of the remote driver. This allows to determine when and/or where it is convenient for the driver to take over the control with respect to characteristics of the remote driver. Alternatively, or additionally, the information on the future traffic situation is predicted based on information on a road profile. The information on the road profile, e.g., indicates whether, when and/or where the transportation vehicle is about to go through curves and/or an expected velocity of the transportation vehicle on (planned) route of the transportation vehicle. This allows, to determine when and/or where it is convenient for the driver to hand over control of the transportation vehicle based with respect to the route of the transportation vehicle. For example, for some drivers it may be rather convenient to hand over the control when the transportation vehicle is travelling on a straight roadway than when the transportation vehicle is going through a curve.

According to some exemplary embodiments, predicting information on the future traffic situation comprises predicting the information on the future traffic situation based on a comparison of the future traffic situation with the driving preferences. For the comparison, the traffic situation may be at least partially characterized by same parameters/criteria as the driving preferences. The comparison allows a deterministic way to determine when and/or where to hand over control of the transportation vehicle. For example, the comparison enables to determine when and/or where to hand over the control based on a deviation of the future traffic situation from the driving preferences. For example, the hand over can be carried out where and/or when the deviation is less than a predetermined threshold. Thus, the hand over can be carried out when and/or where the traffic situation approximately corresponds to the driving behavior of the driver.

The driving preferences, e.g., comprise one or more conditions for the future traffic situation and predicting the information on the future traffic situation comprises predicting the information on the future traffic situation based on a comparison of the one or more conditions and the future traffic situation. The conditions may prohibit switching in predefined traffic situations, e.g., while the transportation vehicle is going through a curve, a construction site, and/or when the transportation vehicle is in other situations challenging for the driver in the transportation vehicle. So, the conditions may allow a more secure handover of control. Optionally, the conditions comprise conditions for an acceleration, deceleration, speed, steering angle of the transportation vehicle, distance to one or more surrounding transportation vehicles, and/or a road profile in the traffic situation which allow a more profound assessment of whether the future traffic situation is safe for switching from the remote driving mode to the automated driving mode than In practice a plurality of (estimated) future traffic situations may be considered to determine the future traffic situation (suitable) for switching from the remote driving mode to the manual driving mode. This allows, e.g., to determine the most convenient and/or one or more intervals for switching from the remote driving mode to the manual driving mode.

In some exemplary embodiments, the method further comprises causing the transportation vehicle or requesting a remote driver to adapt driving parameters affecting the future traffic situation to fulfill the conditions within the remote operation interval. In this way, a convenient future traffic situation for switching from the remote driving mode to the manual driving mode may be actively created or forced, e.g., to enable the handover during the remote operation interval for a seamless handover.

According to some exemplary embodiments, the handover time and/or the handover place are/is indicative of the latest future traffic situation for switching from the remote driving mode to the manual driving mode within the remote operation interval. This may give the driver as much time as possible to react and prepare himself or herself to take over control of the transportation vehicle.

In some exemplary embodiments, the method is executed on a data processing circuit remote from the transportation vehicle. This allows to save resources (e.g., processing power, processing equipment, power consumption) of the transportation vehicle.

According to some exemplary embodiments, the method further comprises receiving a handover request of the driver to hand over the control over the transportation vehicle to the driver before the handover time and/or handover place and handing over the control comprises handing over the control over the transportation vehicle in response to the handover request. This allows the driver to seamlessly take control of the transportation vehicle on demand.

Other exemplary embodiments provide a computer program having a program code for performing at least one of the methods of the preceding claims, when the computer program is executed on a computer, a processor, or a programmable hardware component.

Further exemplary embodiments provide an apparatus which comprises one or more interfaces for communication and a data processing circuit configured to control the one or more interfaces. The data processing circuit and the one or more interfaces are configured to execute one of the methods described herein.

Other exemplary embodiments provide a transportation vehicle or an infrastructure component comprising the apparatus proposed herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed, or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be similarly interpreted.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes", or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Tele-operated or remote driving can be deployed to implemented mobility and transport services like tele-operated parking, tele-operated taxi, and/or tele-operated goods transport. For the different deployments of remote driving for mobility and transport services it is desired to provide a safe handover from the remote driving mode to the manual driving mode. A handover to the manual driver can be triggered due to conditions breach in the operational design domain (ODD), e.g., a lack in a connectivity to a remote control center for remote driving. One challenge is to determine a safe situation and/or time interval to hand over control of the transportation vehicle to a (manual) driver in the transportation vehicle. In applications known concepts, the driver may struggle to safely take over control of the transportation vehicle.

Figure 1:
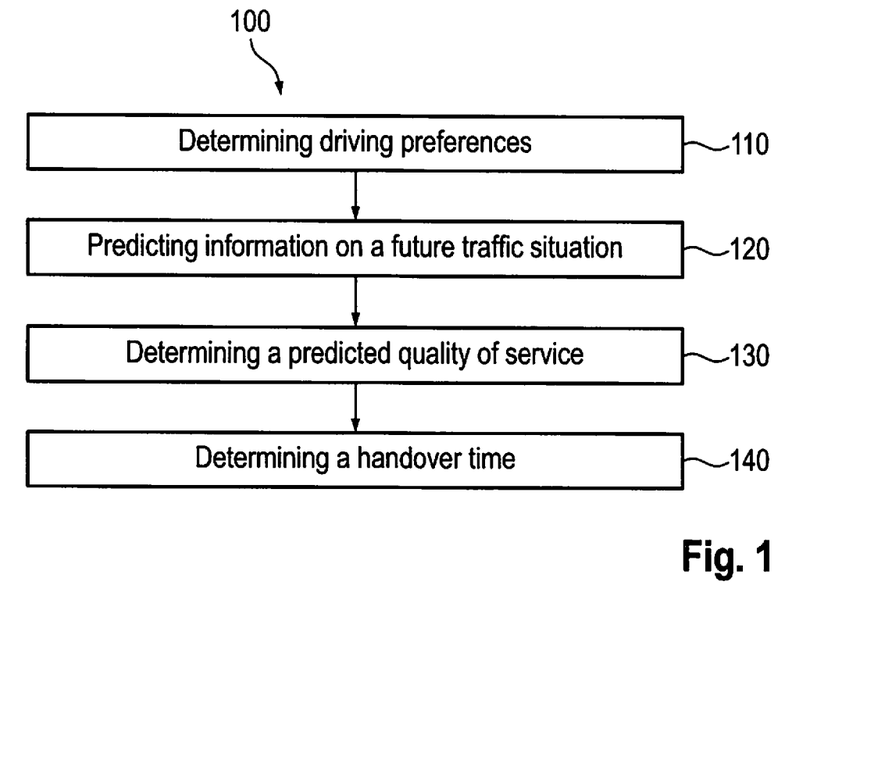
FIG. 1 illustrates a flowchart of an exemplary embodiment of a disclosed method for a transportation vehicle.

Hence, there may be a demand for an improved concept for transferring control of a transportation vehicle when switching from a remote driving mode of the transportation vehicle to a manual driving mode of a transportation vehicle FIG. 1 illustrates a flowchart of an exemplary embodiment of a method 100 for a transportation vehicle which is configured to be remotely operated in a remote driving mode and to be manually operated by a driver in the transportation vehicle in a manual driving mode. The transportation vehicle can be a car, a bus, a truck, or the like. For the remote driving mode, the transportation vehicle may communicate with a remote control center which allows a remote driver or remote operator in the control center to control the transportation vehicle from remote. The remote operator, thus, can have full or at least partial control over the transportation vehicle and, e.g., maneuver the transportation vehicle, accelerate, decelerate, steer, and/or one or more functions (e.g., the airbags, the electronic stability control, ESC, the anti-lock braking system, ABS, and/or the like) in the remote driving mode. Thus, the driver of the transportation vehicle may not need to maneuver the transportation vehicle himself or herself in the remote driving mode. In the remote driving mode, the transportation vehicle, e.g., monitors its environment using one or more (various) sensors (e.g., camera/s, lidar sensor/s, radar sensor/s, and/or the like) to provide the remote operator with information from the sensors, e.g., on a course of a road and/or traffic events in the environment to enable the remote operator to maneuver the transportation vehicle. Then again, the driver fully or at least partially controls the transportation vehicle in the manual driving mode. In both the remote driving mode and the manual driving mode, the driver, and the remote operator, respectively, may have assistance from driving assistance systems which may have partial control of the transportation vehicle. Also, the transportation vehicle may be configured to be automatically operated in an automated driving mode.

Method 100 comprises determining 110 driving preferences of the driver based on driving behavior of the driver. The driving behavior can be understood as a manner of driving of the driver when the driver maneuvers the transportation vehicle by oneself, e.g., in the manual driving mode. To obtain the driving behavior, e.g., a velocity, an acceleration, and/or a distance of the transportation vehicle to one or more other transportation vehicles in its environment are recorded in the manual driving mode. So, the driving preferences may be determined from records indicative of the velocity, the acceleration, and/or the distance to other transportation vehicles. The driving preferences, e.g., are indicative of a function, a mean, a maximum, or a minimum value for the velocity, the acceleration, and/or the distance to other transportation vehicles. The driving preferences can be also "driving capabilities" of the driver. Although the present disclosure is limited to the velocity, the acceleration, and/or the distance to other transportation vehicles, it is noted that also one or more other or further criteria may be used to determine and/or represent the driving preferences. To save resources of the transportation vehicle, the driving preferences may be determined remote from the transportation vehicle, e.g., by an infrastructure component.

Further, method 100 comprises predicting 120, based on the driving preferences, information on a future traffic situation for switching from the remote driving mode to the manual driving mode. In context of the present disclosure, the (future) traffic situation can be understood as a momentary or temporary scene to which the transportation vehicle is exposed. The future traffic situation for switching from the remote driving mode to the manual driving mode accordingly can be understood as a momentary or temporary scene for which it may be convenient for the driver to switch from the remote driving mode to the manual driving mode with respect to the driving preferences. Accordingly, the information on the future traffic situation, e.g., is indicative of a time and/or a location of the future traffic situation convenient/suitable for switching from the remote driving mode to the manual driving mode with regard to the driving preferences of the driver. The future traffic situation, e.g., is convenient/suitable for switching from the remote driving mode to the manual driving mode with regard to the driving preferences if the future traffic situation is reconcilable with the driving preferences. This, e.g., is the case if the transportation vehicle's acceleration, velocity, steering angle, and/or distance to other transportation vehicles in the future traffic situation differs no more than by a predefined deviation from the driving preferences. To determine the information on the future traffic situation, a plurality of estimated future traffic situations and/or an estimated future development of the traffic situation of the transportation vehicle may be compared to the driving preferences of the driver. In this way, e.g., also a time interval and/or an area, or a road section may be determined for switching from the remote driving mode to the manual driving mode. Accordingly, the information on the future traffic situation may be also indicative of such a time interval and/or an area/road section. For predicting 120 the information on the future traffic situation, e.g., a motion model based on previous findings is used to predict future traffic situations based on a current traffic situation.

Also, method 100 comprises determining 130 a predicted quality of service (pQoS) of a communication link for the remote driving mode and a remote operation interval for which the transportation vehicle is operable in the remote driving mode based on the pQoS. The pQoS, e.g., is determined from a history of a quality of service (QoS) of the communication link and/or a location of the transportation vehicle. For example, it is known from the history that in preceding situations where the transportation vehicle entered a tunnel the QoS and/or the communication link worsens such that remote driving is not possible for a time in the tunnel. Thus, the pQoS can be determined from the location of the transportation vehicle and the history. The pQoS also may be determined in another way, e.g., by a pattern in the course of the QoS. Thus, the pQoS, e.g., provides a prediction for an area, a time or a duration for which a quality of service (e.g., data rate, latency, etc.) is sufficient for remote driving. Accordingly, the remote operation interval may be indicative of a time interval and/or an area where and/or when the QoS of the communication link is sufficient for remote driving and, thus, where and/or when the transportation vehicle is operable from remote in the remote driving mode. Hence, the pQoS allows to determine when a seamless handover is possible, i.e., while the transportation vehicle is operable from remote.

Method 100 further comprises determining 140 a handover time and/or a handover place for switching from the remote driving mode to the manual driving mode based on the remote operation interval and the information on the future traffic situation. In particular, the handover time and/or the handover place may be a time or place when/where a safe and seamless handover is possible with respect to the remote operation interval and the information on the future traffic situation. The handover time, e.g., is indicative of a point in time or a duration until switching from the remote driving mode to the manual driving mode. The handover place, e.g., is indicative of a coordinates or a distance up to switching from the remote driving mode to the manual driving mode. Hence, the handover time and the handover place enable a safe and seamless handover. The handover time and/or the handover place, e.g., relate to a future traffic situation for a seamless and safe handover, i.e., where and when, respectively, it is convenient and safe for the driver in the transportation vehicle to take over control over the transportation vehicle within the remote operation interval. The handover time and/or the handover place then may be transmitted to the remote control center and/or the transportation vehicle for the seamless and safe handover of control of the transportation vehicle.

A skilled person will understand that the above concept may be applied when the remote operation interval is large enough to determine at least one suitable future traffic situation for switching from the remote driving mode to the manual driving mode. In scenarios, where the communication link breaks off abruptly, the above concept may be not applied and the control may be handed over to the driver in the transportation vehicle before the handover time and/or immediately.

Predicting 120 information on the future traffic situation may comprise predicting the information on the future traffic situation based on information on a current traffic situation, information on one or more present control commands of a remote driver in the remote driving mode, information on the remote driver, information on a road profile, and/or information on driving behavior of the remote driver. For example, it is determined when and/or where the control is transferred to the driver based on the driving preferences and based on at least one of the current traffic situation, the information on one or more present control commands of a remote driver in the remote driving mode, the information on the remote driver, the information on a road profile, and the information on driving behavior of the remote driver.

For example, the information on the current traffic situation indicates that, based on the driving preferences, it may be convenient for the driver to take over the control soon or within a certain time as of now. So, the future traffic situation may be a future traffic situation within the certain time as of now. Accordingly, if the current traffic situation is convenient for switching from the remote driving mode to the manual driving mode, the information on the future traffic situation may be indicative of a certain time interval as of now for switching from the remote driving mode to the manual driving mode.

The information on the one or more present commands, e.g., indicates whether remote driver accelerates, brakes, and/or changes a direction of the transportation vehicle to maneuver the transportation vehicle. It is a finding that it is inconvenient for the driver to take over the control while the remote driver accelerates, brakes, and/or changes the direction of the transportation vehicle. Accordingly, the future traffic situation may be a situation where the remote driver does not brake, accelerate, and/or change the direction of the transportation vehicle. Also, the one or more present commands may allow to determine, starting from the current traffic situation, the future traffic situation where and/or when it is convenient to switch from the remote driving mode to the manual driving mode.

The information on the remote driver, e.g., is indicative of an experience, an age, and/or gender of the remote driver. Depending on an experience, the age, the driving behavior, and/or the gender, the remote driver may, e.g., drive rather defensive, or aggressive, e.g., with less distance to another transportation vehicle and higher speed. For a defensive driving remote driver, it may be convenient for the driver to take over control of the transportation vehicle where and/or when it may be inconvenient for an aggressive driving remote driver. For example, for the defensive driving remote driver, it may be convenient for the driver to take over control over the transportation vehicle in a curve while it may be not for an aggressive driving remote driver. Accordingly, the information on the future traffic situation may depend on the information on the remote driver and/or the driving behavior of the remote driver to provide a safe handover for various or different remote drivers.

The information on the road profile, e.g., is indicative of a predefined route of the transportation vehicle and, e.g., where the route has curves, straights, and/or where the transportation vehicle (probably) stops, stands still and/or, accelerates or decelerates. The future traffic situation may be a traffic situation where the transportation vehicle stands still or at least neither accelerates, decelerates, nor goes through a curve. Accordingly, the information on the future traffic situation may indicate where and/or when the transportation vehicle stands still or at least neither accelerates, decelerates, nor goes through a curve, i.e., drives (roughly) with constant speed on a straight.

In practice, the information on the future traffic situation may be determined based on multiple and/or an arbitrary combination of the information on a current traffic situation, the information on one or more present control commands, the information on the remote driver, the information on a road profile, and/or the information on driving behavior of the remote driver. This, e.g., allows to determine an ideal future traffic situation for switching from the remote driving mode to the manual driving mode with regard to the above disclosed embodiments.

It is noted that the information on the future traffic situation may be also predicted based on other and/or further criteria and/or information.

Predicting 120 information on the future traffic situation comprises predicting the information on the future traffic situation based on a comparison of the future traffic situation with the driving preferences. The skilled person having benefit from the present disclosure will readily understand that the future traffic situation may be at least partially described by one or more same criteria/parameters as the driving preferences. For example, the future traffic situation as well as the driving preferences may be characterized with regard to a distance to one or more other transportation vehicles, the velocity/speed, the acceleration, the deceleration of the transportation vehicle, and/or the like. The comparison, e.g., provides a deviation between those criteria in the driving preferences and the future traffic situation and, thus, e.g., allows a deterministic way to determine when and/or where to hand over control of the transportation vehicle based on the deviation.

As laid out previously, the driving preferences can comprise one or more conditions for the future traffic situation and predicting information on the future traffic situation may accordingly comprise predicting the information on the future traffic situation based on a comparison of the one or more conditions and the future traffic situation. The conditions correspond to or comprise conditions for the acceleration, the deceleration, the velocity of the transportation vehicle, the road profile, and/or the distance to one or more other transportation vehicles in the environment of the transportation vehicle and, e.g., are defined such that it is convenient for the driver in the transportation vehicle to take over control of the transportation vehicle if one, multiple, or all of the conditions are fulfilled for a future traffic situation. The conditions, e.g., are indicative of respective thresholds for the acceleration, the deceleration, the velocity, and/or the distance and the conditions may be fulfilled for a future traffic situation if the acceleration, the deceleration, and/or the velocity fall short of and/or the distance exceeds the respective threshold in the future traffic situation.

In some scenarios, the conditions are not expected to be met within the remote operation interval, e.g., since the remote driver generally drives faster and/or with less distance to other transportation vehicles than it is reconcilable with the driving preferences of the driver in the transportation vehicle. In some scenarios, e.g., the remote driver lets the transportation vehicle travel continuously faster than reconcilable with the driving preferences while the transportation vehicle travels on a highway and it is not expected that the remote driver slows down the transportation vehicle (e.g., regarding the driving behavior of the remote driver) until the transportation vehicle enters a tunnel and the remote operation interval ends since the communication links breaks off. Therefore, the proposed concept may provide for causing the transportation vehicle or requesting a remote driver to adapt driving parameters affecting the future traffic situation to fulfill the conditions within the remote operation interval. This may enable a safe handover in the above and other equivalent scenarios. The driving parameters, e.g., are indicative of parameters affecting the velocity, the acceleration, the deceleration, a travel direction, and/or the like. Requesting the remote driver to adapt the driving parameters, e.g., comprises giving the remote driver a visual, tactile, and/or acoustic warning for asking the remote driver to slow down for switching from the remote driving mode to the manual driving mode. Optionally, the warning may also indicate the conditions for the handover and/or the remote operation interval. Also, automatic systems may cause the transportation vehicle to fulfill the conditions. For example, the transportation vehicle may automatically brake, turn, and/or accelerate to reach a traffic situation suitable for switching from the remote driving mode to the manual driving mode.

In practice, multiple future traffic situations are determined for switching from the remote driving mode to the manual driving mode. To give the driver in the transportation vehicle as much time as possible to react and prepare for taking over control of the transportation vehicle, the handover time and/or the handover place may be indicative of the latest future traffic situation for switching from the remote driving mode to the manual driving mode within the remote operation interval.

In some exemplary embodiments, the proposed concept allows the driver in the transportation vehicle to take control over the transportation vehicle upon request. Accordingly, method 100 may comprise receiving a handover request of the driver to hand over the control over the transportation vehicle to the driver before the handover time and handing over the control may comprise handing over the control over the transportation vehicle in response to the handover request.

The proposed concept may be also implemented in an apparatus as described with reference to FIG. 2.

Figure 2:
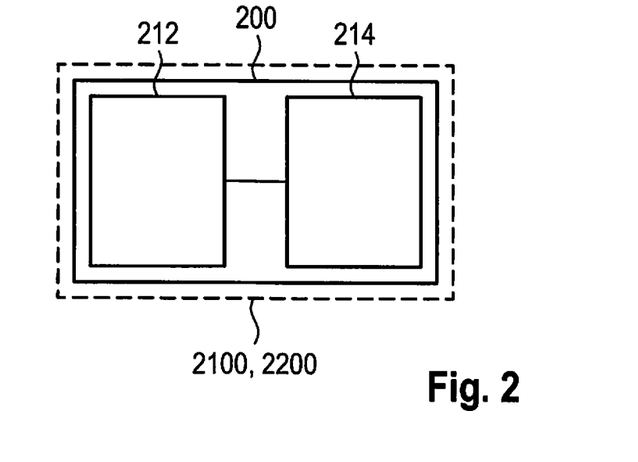
FIG. 2 schematically illustrates a block diagram of an exemplary embodiment of a disclosed apparatus for carrying out the disclosure.

FIG. 2 illustrates a block diagram schematically illustrating an exemplary embodiment of an apparatus 200 for carrying out the concept proposed herein.

The apparatus 200 comprises one or more interfaces 212 for communication. Also, the apparatus 200 comprises a data processing circuit 214 configured to control the one or more interfaces 212. The data processing circuit 214 and the one or more interfaces 212 further are configured to execute method 100.

In disclosed embodiments, the one or more interfaces 212 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 212 may comprise further components to enable in accordance with an exemplary embodiment of method 100 communication for receiving information on the driving behavior of the driver and/or on information indicative of the pQoS and/or QoS. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 212 may be coupled to one or more antennas, which may correspond to any transmit and/or receive antennas, such as horn antennas, dipole antennas, patch antennas, sector antennas etc. In some examples the one or more interfaces 212 may serve the purpose of transmitting the handover time and/or the handover place to the remote control center and/or the transportation vehicle for performing the handover in accordance with the handover place and/or handover time.

As shown in FIG. 2 the respective one or more interfaces 212 are coupled to the data processing circuit 214 of the apparatus 200. In disclosed embodiments, the communication circuit 214 may be implemented using one or more processing units, one or more processing devices, any method or mechanism for processing, such as a processor, a computer or a programmable hardware component being operable with accordingly adapted software. In other words, the described functions of the data processing circuit 214 may as well be implemented in software, which is then executed on one or more programmable hardware components. Such hardware components may comprise a general-purpose processor, a Digital Signal Processor (DSP), a micro-controller, etc.

As indicated by dashed lines, apparatus 200 is optionally implemented in a transportation vehicle 2100, e.g., in the above described transportation vehicle.

Optionally, the proposed concept is implemented in an infrastructure component 2200 remote from the transportation vehicle. Respectively, the method 100 may be executed on a data processing circuit (of the infrastructure component) remote from the transportation vehicle.

Some of the above are described hereinafter with reference to an exemplary application of the proposed concept.

Figure 3:
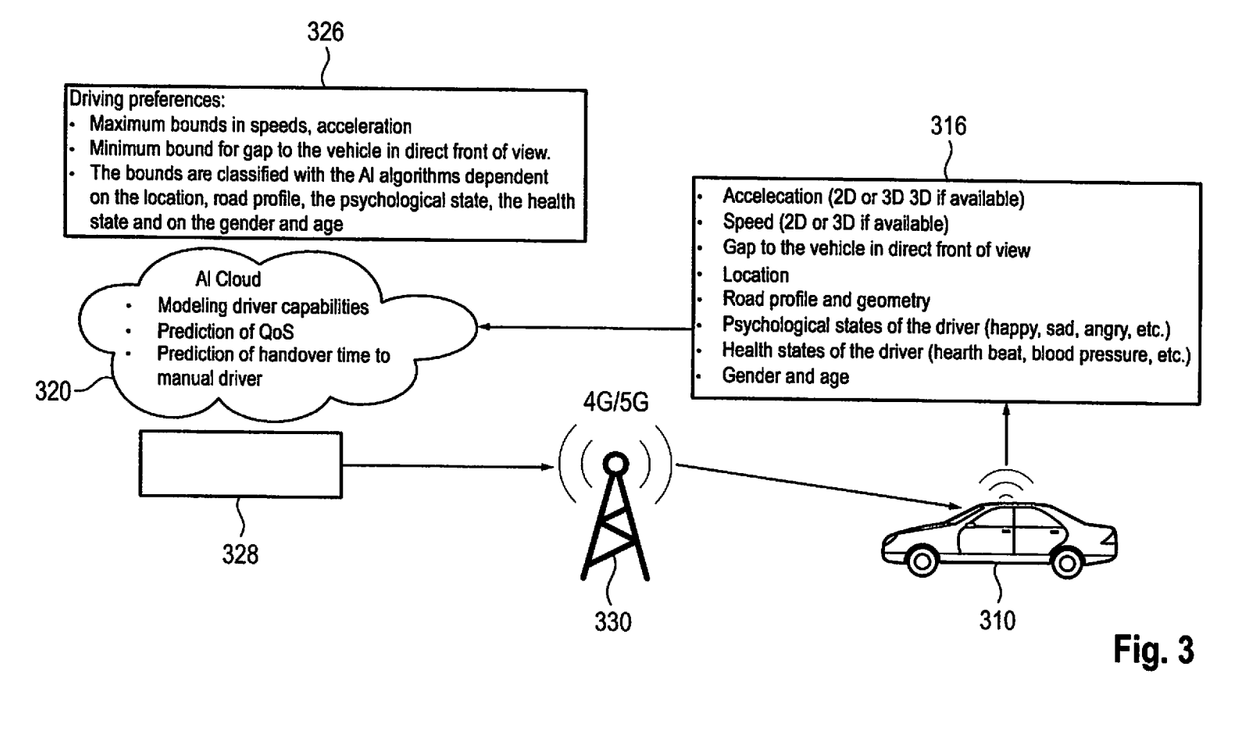
FIG. 3 schematically illustrates a block diagram of an exemplary application of the disclosure.

FIG. 3 illustrates a block diagram schematically illustrating an application of the proposed concept. As can be seen from the block diagram a transportation vehicle 310 is communicatively connected to an infrastructure component 320 via a communication network 330. In the shown application, the infrastructure component 320 is a cloud (for cloud computing). Although FIG. 3 merely shows a cloud for the infrastructure component, the infrastructure component is not limited to a cloud and also other processing circuitries may be used for the infrastructure component.

The cloud 320 may comprise a plurality of nodes. The cloud 320 may comprise one or multiple of those nodes for receiving and processing information in the manner of the proposed concept. In particular, the cloud 320 may be configured to use artificial intelligence (AI) for the processing, as stated in more detail later. In some other applications, the transportation vehicle 310 can be part of the cloud 320.

The communication network 330 may use one or more arbitrary communication technologies and/or standards to communicatively connect the transportation vehicle 310 and the cloud 320. In particular, the communication network 330 may be a mobile communication network. The (mobile) communication network 330 may, for example, be or comprise an Orthogonal Time Frequency Space (OTFS) system or one of the Third Generation Partnership Project (3GPP)-standardized mobile communication networks. The communication network 330 may correspond to or comprise a mobile communication system of the 4th or 5th Generation (4G, 5G) and may use mm-Wave technology. The communication network 330 may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In a first phase, data 316 related to the driving behavior of the driver is collected during manual driving, i.e., in the manual driving mode, and provided to the cloud 320 via the communication network 330.

The collected data 316, e.g., comprise information on:
acceleration (in 2D or 3D if available);
speed (2D or 3D if available);

gap/distance to one or more other transportation vehicles, e.g., another transportation vehicle in (direct) front of transportation vehicle 310;

location/position of transportation vehicle 310;

road profile and/or geometry of a travelled route;

psychological state(s) of the driver (happy, sad, angry, etc.);

health state(s) of the driver (heart beat, blood pressure, etc.);

gender and/or age of the driver.

The data 316 can be collected with onboard sensors in the transportation vehicle. Also, the data 316 can be transmitted together with other messages (e.g., with a cooperative awareness message, CAM) to the cloud 320 and/or, e.g., with the same rate as CAMs where the rate depends on the transportation vehicle speed. The collected data 316 is processed (e.g., using AI algorithms) in the cloud 320 to obtain driving preferences 326. In some applications, the driving preferences 326 can be understood as driving capabilities or driver capabilities indicative of driving skills of the driver in the transportation vehicle.

The driving preferences 326 can be expressed by one or more conditions for the transportation vehicle's velocity/speed, acceleration, and/or distance to one or more other transportation vehicles. Accordingly, the driving preferences 326 may be indicative of:

a maximum speed bound;

a maximum acceleration bound; and/or a minimum bound for gap to the transportation vehicle in direct front of view.

The conditions and bounds may be registered and/or classified (e.g., in a look-up table for AI algorithms) regarding to the location, the road profile, the psychological state, the health state and on the gender and age. The driving preferences 326 and the conditions may be associated with respective drivers of the transportation vehicle. Also, the driving preferences 326 and the conditions may be continuously updated in each driving session in the manual driving mode. The "driver-specific" driving preferences 326 enable a personalized handover for switching from the remote driving mode to the manual driving mode.

In a second phase, the transportation vehicle may be operated in the remote driving mode and within the ODD. The remote controller operates transportation vehicle 310 via a communication link over the 4G or 5G communication network 330 and the (manual) driver does not need to take any action during the remote driving mode until the handover of control of the transportation vehicle 310 to the driver. The proposed concept may particularly provide a seamless and safe handover of control. For this, e.g., a handover time 328 indicating when the handover can happen safely and seamlessly. The following shows exemplarily how the handover time 328 can be determined by the cloud 320. The cloud 320, e.g., also receives information on a current traffic situation. For example, the cloud 320 receives the information on the current traffic situation from transportation vehicle 310. The information on the current traffic situation, e.g., is indicative of:

a current acceleration of transportation vehicle 310 (in 2D or 3D if available);

a current velocity/speed (in 2D or 3D if available);

a current gap/distance to one or more other transportation vehicles; and/or a current location.

Also, the cloud 320 may receive actual information on the driver in the transportation vehicle and information on the road profile and/or geometry in the environment and/or of a planned route. The actual information on the driver, e.g., indicates:

an actual psychological state of the driver (happy, sad, angry, etc.);

an actual health state of the driver (hearth beat, blood pressure, etc.); and the gender and actual age of the driver.

The cloud 320, e.g., predicts the QoS of the communication link between transportation vehicle and a remote control center for the planned route in the remote driving mode to obtain the pQoS. So, the cloud 320 can determine, based on the pQoS, one or more remote operation intervals for (separate) remote driving sessions along the route, i.e., time intervals and/or areas when and/or where the QoS is sufficient for remote driving. The remote driving sessions, e.g., are separated by intervals where/when the QoS is insufficient and the transportation vehicle 310, thus, is operated in the manual or another driving mode. In particular, the cloud 320 can determine a remote operation interval for a present remote driving session and where/when the QoS is continuously sufficient for operating transportation vehicle 310 in the present remote driving session. For this, the cloud 320 can determine for the remote operation interval a point in time or a place where the QoS becomes insufficient for remote driving. This, e.g., happens when transportation vehicle 310 passes through a tunnel or other areas where the QoS is insufficient for remote driving.

In an exemplary case, transportation vehicle 310, e.g., travels along a roughly straight highway in the remote driving mode, is going to take the next exit from the highway, and will pass a tunnel after the exit. In the exemplary case, the QoS, e.g., is sufficient as long as transportation vehicle 310 travels along the highway and goes through the exit and the QoS will become insufficient when transportation vehicle 310 enters the tunnel. Also, the driving preferences may indicate that the driver in the transportation vehicle may have trouble to take over control in curves as he or she is a new driver.

Also, the cloud 320 may predict one or more future traffic situations in the present remote driving session based on information on the current traffic situation and a motion model for the present remote driving session. The motion model, e.g., indicates how the current traffic situation evolves and, e.g., is based on information on one or more present control commands of a remote driver in the remote driving mode, information on the remote driver, information on a road profile, and/or information on driving behavior of the remote driver. Thus, the cloud 320 can predict information on an acceleration, speed/velocity, and/or gap/distance to one or more other transportation vehicles for the planned route. This particularly allows the cloud to predict, based on the driving preferences, information on at least one future traffic situation for switching from the remote driving mode to the manual driving mode, i.e., information on at least one future traffic situation suitable for the driver to take over control of the transportation vehicle in accordance with the driving preferences for the future traffic situation.

For the above driving preferences in the exemplary case, such future traffic situations may occur on the highway where it may be convenient for the driver to take over control on a straight while it may be inconvenient for the driver to take over control in the exit where transportation vehicle 310 may go through a curve. Other such traffic situations which are convenient for the driver to take over control may occur after the tunnel, i.e., outside the remote operation interval. Accordingly, the information on the future traffic situation may be indicative of intervals (e.g., a time interval and/or a location or area) on the highway and after the tunnel in the exemplary case.

According to what is described above, the proposed concept provides for switching from the remote driving mode to the manual driving mode within the remote operation interval for a seamless handover. For this, the cloud 320 may determine based on the information on the future traffic situation and the remote operation interval for the handover time 328 a time where transportation vehicle 310 travels on the highway for a convenient, safe, and seamless handover. Then, cloud 320 may transmit the determined handover time 328 via the communication network 330 to the transportation vehicle 310 to enable the transportation vehicle 310 to orchestrate and execute the handover in accordance with the determined handover time 328, e.g., such that the driver of transportation vehicle 310 takes over control over transportation vehicle 310 at the handover time 328. To give the driver as much time as possible, the handover time 328 can be indicative of the latest point in time where the handover can happen safely on the highway, e.g., 500 m before transportation vehicle 310 reaches the exit.

To prepare the driver for taking over control of transportation vehicle 310, the transportation vehicle 310 may issue a warning or message to the driver which asks the driver to prepare for the handover. For this, any human-machine-interface (HMI) may be used.

The skilled person having benefit from the present disclosure will appreciate that the above concept also applies to a location-based determination of the handover. For example, the above concept can alternatively or additionally provide a handover place indicative of a location for switching from the remote driving mode to the manual driving mode.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

REFERENCE LIST

100 Method for a transportation vehicle
110 determining driving preferences
120 predicting information on a future traffic situation
130 determining a pQoS
200 apparatus
212 one or more interfaces
214 data processing circuit
310 transportation vehicle
320 cloud
330 communication network
316 data related to driving behavior
326 driving preferences
328 handover time
2100 transportation vehicle
2200 infrastructure component

The invention claimed is:

1. A method for a transportation vehicle configured to be remotely operated in a remote driving mode and to be manually operated by a driver in the transportation vehicle in a manual driving mode, the method comprising:
determining driving preferences of the driver based on driving behavior of the driver;
predicting information indicating a future traffic situation that will occur in the future indicating the driver's preference to switch from the remote driving mode to the manual driving mode based on the driver driving preferences;
determining a predicted quality of service (pQoS) of a communication link required for the remote driving mode in the future;
determining a remote operation interval in the future for which the transportation vehicle is operable in the remote driving mode based on the pQoS and a determination of whether the pQoS is sufficient for remote operation of the transportation vehicle during the future remote operation interval such that handover switching from the remote driving mode to the manual driving mode is possible at an end of the remote operation interval based on the pQOS and the information indicating the future traffic situation;
determining a handover time and/or handover place for switching from the remote driving mode to the manual driving mode based on the determined remote operation interval and the predicted information indicating the future traffic situation; and handing over control of the transportation vehicle to the driver at or before the handover time and/or handover place.

2. The method of claim 1, wherein the predicting information indicating the future traffic situation comprises predicting the information indicating the future traffic situation based on information indicating a current traffic situation, information indicating one or more present control commands of a remote driver in the remote driving mode, information indicating the remote driver, information indicating a road profile, and/or information indicating driving behavior of the remote driver.

3. The method of claim 1, wherein predicting information indicating the future traffic situation comprises predicting the information indicating the future traffic situation based on a comparison of the future traffic situation with the driving preferences.

4. The method of claim 1, wherein the driving preferences comprise one or more conditions for the future traffic situation, and wherein predicting information indicating the future traffic situation comprises predicting the information indicating the future traffic situation based on a comparison of the one or more conditions and the future traffic situation.

5. The method of claim 4, wherein the conditions comprise conditions for an acceleration, a velocity of the transportation vehicle, a road profile, and/or a distance to one or more other transportation vehicles in the environment of the transportation vehicle.

6. The method of claim 4, further comprising causing the vehicle or requesting a remote driver to adapt driving parameters affecting the future traffic situation to fulfill the conditions within the determined remote operation interval.

7. The method of claim 1, wherein determining the handover time and/or the handover place comprises determining multiple future traffic situations for switching from the remote driving mode to the manual driving mode, and wherein the handover time and/or the handover place are/is indicative of a latest of multiple future traffic situations for switching from the remote driving mode to the manual driving mode within the determined remote operation interval.

8. The method of claim 1, wherein the information indicating the future traffic situation comprises information indicating a time and/or a location for switching from the remote driving mode to the manual driving mode in the future.

9. The method of claim 1, wherein the method is executed using a data processing circuit remote from the transportation vehicle.

10. The method of claim 1, further comprising receiving a handover request from the driver to hand over the control over the transportation vehicle to the driver before the handover time and/or handover place, and wherein handing over the control comprises handing over the control over the transportation vehicle in response to the handover request.

11. A non-transitory computer readable medium including a computer program having a program code for performing the method of claim 1, when the computer program is executed on a computer, a processor, or a programmable hardware component.

12. An apparatus comprising:
one or more interfaces for communication; and
a data processing circuit to control the one or more interfaces, wherein the data processing circuit and the one or more interfaces are configured to enable operation of a transportation vehicle configured to be remotely operated in a remote driving mode and to be manually operated by a driver in the transportation vehicle in a manual driving mode, wherein the data processing circuit and the one or more interfaces are configured to:
determine driving preferences of the driver based on driving behavior of the driver;
predict information indicating a future traffic situation that will occur in the future indicating the driver's preference to switch from the remote driving mode to the manual driving mode based on the driver driving preferences;
determine a predicted quality of service (pQoS) of a communication link required for the remote driving mode in the future and a remote operation interval for which the transportation vehicle is operable in the remote driving mode based on the pQoS and a determination of whether the pQOS is sufficient for remote operation of the transportation vehicle during the future remote operation interval such that handover switching from the remote driving mode to the manual driving mode is possible at an end of the remote operation interval based on the pQoS and the information indicating the future traffic situation;
determine a handover time and/or handover place for switching from the remote driving mode to the manual driving mode based on the determined remote operation interval and the predicted information on the future traffic situation; and
hand over control over the transportation vehicle to the driver at or before the handover time and/or handover place.

13. A transportation vehicle comprising the apparatus of claim 12.

14. An infrastructure component comprising the apparatus of claim 12.

15. The apparatus of claim 12, wherein the prediction of information indicating the future traffic situation comprises predicting the information indicating the future traffic situation based on information indicating a current traffic situation, information indicating one or more present control commands of a remote driver in the remote driving mode, information indicating the remote driver, information indicating a road profile, and/or information indicating driving behavior of the remote driver.

16. The apparatus of claim 12, wherein prediction of information indicating the future traffic situation comprises prediction of the information indicating the future traffic situation based on a comparison of the future traffic situation with the driving preferences.

17. The apparatus of claim 12, wherein the driving preferences comprise one or more conditions for the future traffic situation, and wherein predicting information indicating the future traffic situation comprises predicting the information indicating the future traffic situation based on a comparison of the one or more conditions and the future traffic situation.

18. The apparatus of claim 17, wherein the conditions comprise conditions for an acceleration, a velocity of the transportation vehicle, a road profile, and/or a distance to one or more other transportation vehicles in the environment of the transportation vehicle.

19. The apparatus of claim 17, wherein the data processing circuit and the one or more interfaces are further configured to cause the vehicle or request a remote driver to adapt driving parameters affecting the future traffic situation to fulfill the conditions within the determined remote operation interval.

20. The apparatus of claim 12, wherein the determination of the handover time and/or the handover place comprises determination of multiple future traffic situations for switching from the remote driving mode to the manual driving mode, and wherein the handover time and/or the handover place are/is indicative of a latest of multiple future traffic situations for switching from the remote driving mode to the manual driving mode within the determined remote operation interval.

21. The apparatus of claim 12, wherein the information indicating the future traffic situation comprises information indicating a time and/or a location for switching from the remote driving mode to the manual driving mode.

22. The apparatus of claim 12, wherein the data processing circuit and the one or more interfaces are configured to receive a handover request from the driver to hand over the control over the transportation vehicle to the driver before the handover time and/or handover place, and wherein handing over the control comprises handing over the control over the transportation vehicle in response to the handover request.

* * * * *